S. C. Moore.
Raisin Seeding Mach.
Nº 53,855. Patented Apl 10. 1866.

Witnesses
Cornelius Bollinger
F. G. Ehmann

Inventor
Saml. C. Moore
By his Atty J Dennis Jr

UNITED STATES PATENT OFFICE.

SAMUEL C. MOORE, OF BOSTON, MASSACHUSETTS.

IMPROVED MACHINE FOR SEEDING RAISINS.

Specification forming part of Letters Patent No. 53,855, dated April 10, 1866.

*To all whom it may concern:*

Be it known that I, SAMUEL C. MOORE, of Boston, Suffolk county, State of Massachusetts, have invented a new and useful Machine for Seeding Raisins and for Seeding and Stoning other Fruit; and I do hereby declare the following description and accompanying drawings are sufficient to enable any person skilled in the art or science to which it most nearly appertains to make and use my said invention or improvements without further invention or experiment.

The nature of my invention and improvements consists in making a spiked or toothed cylinder to work in connection with a ribbed or grated cylinder, so that the teeth of the toothed cylinder will puncture the raisin or fruit and push the seed or stone out of the fruit into and through the opening in the grated cylinder, while the grate of the cylinder retains or prevents the fruit from being carried through it by the teeth with the seeds or stones; and in a stationary scraper toothed or otherwise arranged inside of the grated cylinder, to catch and remove the seeds and stones forced into the cylinder by the teeth of the toothed cylinder; and in some stationary prongs for removing the fruit after it is seeded or stoned from the teeth of the toothed cylinder; and in some stationary teeth for removing the seed or stones from the teeth of the toothed cylinder.

Figure 1:
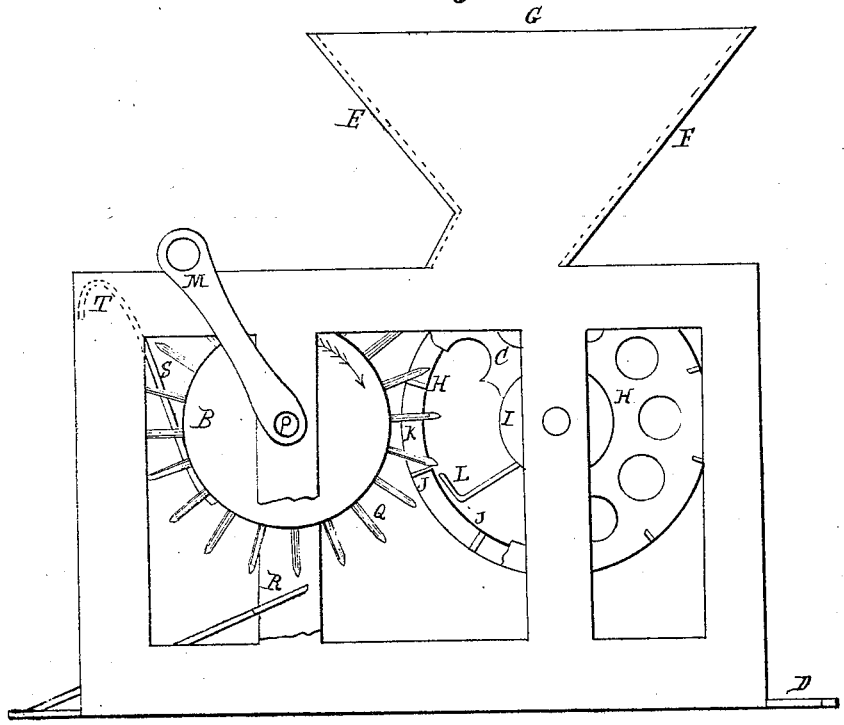
Figure 2:
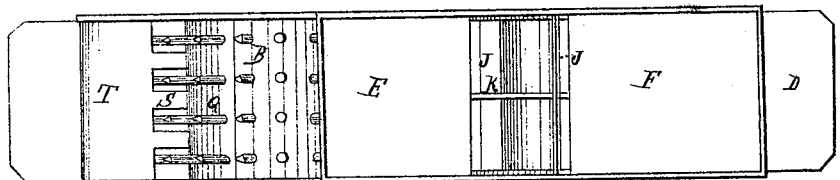
Figure 3:
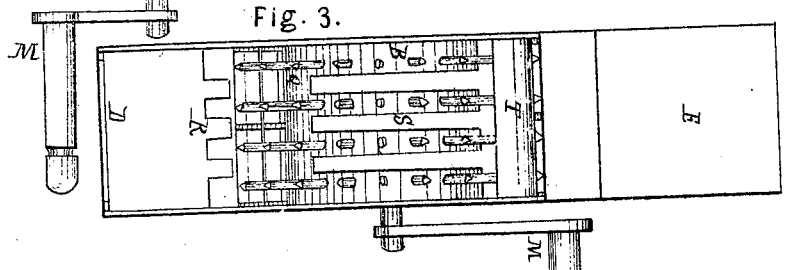

In the accompanying drawings, Figure 1 is an elevation of my improved machine. Fig. 2 is a plan or top view of the same. Fig. 3 is an elevation of the right-hand end.

In these drawings, A A are the sides of the frame, which may be made of metal in the form shown, or in such other form as will answer the purpose, and perforated for the shafts of the cylinders B and C where required. The sides A A are connected together by the bottom piece, D, and by the ends of the hopper E and F. The sides A A extend up and form the sides of the hopper G, as shown in Fig. 1.

The sides of the cylinder H are arranged to turn freely on the stationary shaft I fastened in the standards of the sides A. The sides of the cylinder H are connected by a series of bars, J J, and these bars are connected by one or more circular ribs, K, to form a cylindrical grate with open spaces in it, as shown in the bottom of the hopper, Fig. 2. A portion of the rib K is seen in Fig. 1, where the side of the cylinder is broken away to show the stationary scraper or shaft L fastened to the shaft I to catch the seeds and stones from the teeth of the toothed cylinder B. This cylinder B is fastened to the shaft P, which turns in the sides A and is operated by the crank M. The cylinder B is provided with pointed teeth, as shown in the drawings, which work into the openings in cylinder H between the bars and ribs and puncture and pass through the fruit which is forced onto the teeth Q by the ribs and bars of the cylinder H, while the teeth Q push the seeds or stones through the openings in the cylinder H, and they are caught by the scraper L above-mentioned. If any seeds or stones adhere to the teeth Q so as to be brought out of the cylinder H, they may be removed by the stationary rack of teeth R fastened to the bottom D. These teeth R may project in between the teeth Q of the cylinder just far enough to remove the seeds and stones from the teeth Q, but not far enough to remove the fruit pressed onto the teeth by the cylinder H. The teeth Q are set in circles or rows around the cylinder and the prongs S from the bar T, fastened to the sides A, project in between the rows of teeth Q to the surface of the cylinder, so that as the cylinder B is turned in the direction indicated by the arrow the prongs S raise the fruit from the cylinder and clear them off of the teeth free from the seeds and stones. There is sufficient space between the end of the hopper E and the cylinder H for the fruit to pass from the hopper down between the cylinders H and B to feed the machine.

The seeds and stones caught by the scraper L may pass out through the sides or periphery of the cylinder H.

The cylinders H and N may be connected by gearing, if preferred that way.

The teeth and openings in the cylinders must be adapted to the size of the seeds or stones of the fruit to be seeded or stoned.

I claim—

1. The spiked or toothed cylinder B, in combination with the grate or open-frame cylinder H, arranged to work together, substantially as described, for the purposes set forth.

2. In combination with the cylinder H, the scraper L, arranged inside of the cylinder.

3. In combination with the toothed cylinder B, the prongs S for removing the fruit from the teeth of the cylinder.

4. In combination with the toothed cylinder B, the rack of teeth R, for removing the stones, seeds, and pits from the teeth Q.

SAMUEL C. MOORE.

Witnesses:
SAML. W. CREECH, Jr.,
B. E. PERRY.